(12) United States Patent
Kim

(10) Patent No.: US 10,986,046 B2
(45) Date of Patent: Apr. 20, 2021

(54) APPARATUS AND METHOD FOR GENERATING SUMMARY OF CONVERSATION STORING

(71) Applicant: LG ELECTRONICS INC., Seoul (KR)

(72) Inventor: Hyeong Jin Kim, Incheon (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/555,297

(22) Filed: Aug. 29, 2019

(65) Prior Publication Data
US 2019/0386937 A1 Dec. 19, 2019

(30) Foreign Application Priority Data
Jul. 29, 2019 (KR) .................. 10-2019-0091847

(51) Int. Cl.
*H04L 12/58* (2006.01)
*G06F 3/16* (2006.01)
(Continued)

(52) U.S. Cl.
CPC ............ *H04L 51/02* (2013.01); *G06F 3/0481* (2013.01); *G06F 3/04886* (2013.01);
(Continued)

(58) Field of Classification Search
CPC . H04L 51/38; H04W 4/12; G06N 2/20; G06F 3/04886; G06F 17/218; G06F 17/2735; G06F 17/277
See application file for complete search history.

(56) References Cited

U.S. PATENT DOCUMENTS

2019/0342406 A1* 11/2019 Borden ............... G06Q 10/107

FOREIGN PATENT DOCUMENTS

| KR | 10-2013-0097970 A | 9/2013 |
|----|-------------------|--------|
| KR | 10-1769421 B1     | 8/2017 |

* cited by examiner

*Primary Examiner* — El Hadji M Sall
(74) *Attorney, Agent, or Firm* — Birch, Stewart, Kolasch & Birch, LLP

(57) ABSTRACT

Disclosed are a conversation contents summary generating method and a conversation contents summary generating device enabling communication between the conversation contents summary generating device and a user terminal in a 5G communication environment by generating and exposing a summary in a chat room by executing an installed artificial intelligence (AI) algorithm or a machine learning algorithm. A method for generating a summary of conversation contents according to an embodiment of the present disclosure may include collecting conversation texts input by a plurality of conversation participants in a chat room; providing a summary providing interface for outputting a summary of a predetermined range of the conversation texts within the chat room when an operation signal for reviewing a past conversation text is received from the user within a user's chat room including the conversation participants; determining keywords from the predetermined range of the conversation texts within the chat room in response to selection reception by the summary providing interface; generating the summary as a sentence formed by reconstructing the keywords; and exposing the summary on a second surface different from a first surface on which the chat room is exposed, and overlaying and exposing the second surface on the first surface. According to the present disclosure, conversation contents unread and missed by a user in a chat room including a plurality of participants are (Continued)

summarized and provided so that the user may conveniently recognize the conversation contents in the chat room.

20 Claims, 6 Drawing Sheets

(51) Int. Cl.
*G06F 3/0481* (2013.01)
*G06F 3/0488* (2013.01)
*H04W 4/12* (2009.01)
*G06N 20/20* (2019.01)
*G06F 40/117* (2020.01)
*G06F 40/151* (2020.01)
*G06F 40/242* (2020.01)
*G06F 40/268* (2020.01)
*G06F 40/284* (2020.01)

(52) U.S. Cl.
CPC ............ *G06F 3/167* (2013.01); *G06F 40/117* (2020.01); *G06F 40/151* (2020.01); *G06F 40/242* (2020.01); *G06F 40/268* (2020.01); *G06F 40/284* (2020.01); *G06N 20/20* (2019.01); *H04L 51/38* (2013.01); *H04W 4/12* (2013.01)

APPARATUS AND METHOD FOR GENERATING SUMMARY OF CONVERSATION STORING

CROSS-REFERENCE TO RELATED APPLICATION

This present application claims benefit of priority to Korean Patent Application No. 10-2019-0091847, entitled "APPARATUS AND METHOD FOR GENERATING SUMMARY OF CONVERSATION STORING" filed on Jul. 29, 2019, in the Korean Intellectual Property Office, the entire disclosure of which is incorporated herein by reference.

BACKGROUND

1. Technical Field

The present disclosure relates to a device and method for generating a summary of the contents of a conversation, and more particularly, to a device and method for summarizing and providing the contents of a conversation unread and missed by a user in a chat room including a plurality of participants.

2. Description of Related Art

Internet messengers are applications for transmitting messages including texts or graphics between users, and may be implemented as a chat room in which a plurality of users participate. In an embodiment, Internet messengers may include mobile messengers, such as KakaoTalk, Hangouts, Line, WeChat, and Facebook Messenger, executed in a mobile environment, for example, a cellular phone.

Internet messengers may notify a user of whether another user has checked a message and notify the user of a chat room participation status of another user in order to support the user with delivering a message to another user. With an increase in the number of users of Internet messengers, various applications for use in a mobile environment are being developed, and among these various applications, a to-do list management application is used by many users.

Korean Patent Application Laid-Open Publication No. 10-2013-0097970, entitled "Method and apparatus for providing chatting service" (hereinafter referred to as "Related Art 1"), discloses a conversation service providing method and device for facilitating a conversation about the contents of a message input by another user in a chat room.

Korean Patent No. 10-1769421, entitled "To-do management method based on chatting room" (hereinafter referred to as "Related Art 2"), discloses a chat room-based to-do list management method for associating to-do items including tasks and progress statuses of the tasks with a chat room to efficiently manage associated to-do items.

Conversations between a plurality of participants are carried out very quickly in the chat rooms disclosed in Related Art 1 and Related Art 2, and thus it is difficult to follow a conversation when a user momentarily looks off a screen or briefly does another action. In this case, the user needs to arduously scroll up to the last read part and read again in order to follow the conversation.

The above-described background art is technical information retained by the inventor to derive the present disclosure or acquired by the inventor while deriving the present disclosure, and thus should not be construed as art that was publicly known prior to the filing date of the present disclosure.

SUMMARY OF THE INVENTION

An aspect of the present disclosure addresses the shortcoming of the related art in which a user needs to arduously scroll up to the last read part and read again in order to check missed conversation contents in a chat room including a plurality of participants.

An aspect of the present disclosure is to summarize and provide conversation contents unread and missed by a user in a chat room including a plurality of participants.

An aspect of the present disclosure is to convert an abbreviation included in conversation contents into an original word when summarizing and providing the conversation contents unread and missed by a user in a chat room including a plurality of participants.

An aspect of the present disclosure is to convert an emoticon included in conversation contents into a text when summarizing and providing the conversation contents unread and missed by a user in a chat room including a plurality of participants.

An aspect of the present disclosure is to provide an audio summary of conversation contents unread and missed by a user in a chat room including a plurality of participants.

An aspect of the present disclosure is to use optimum processing resources to address the shortcoming of the related art in which a user needs to arduously scroll up to the last read part and read again in order to check missed conversation contents in a chat room including a plurality of participants.

A method for generating a summary of conversation contents according to an embodiment of the present disclosure may include summarizing and providing conversation contents unread and missed by a user in a chat room including a plurality of participants.

In detail, the method for generating a summary of conversation contents according to an embodiment of the present disclosure may include collecting conversation texts input by a plurality of conversation participants in a chat room, providing a summary providing interface for outputting a summary of a predetermined range of the conversation texts within the chat room when an operation signal for reviewing a past conversation text is received from the user within a user's chat room including the conversation participants, determining keywords from the predetermined range of the conversation texts within the chat room in response to selection reception by the summary providing interface, generating the summary as a sentence formed by reconstructing the keywords, and exposing the summary on a second surface different from a first surface on which the chat room is exposed, and overlaying and exposing the second surface on the first surface.

By using the method for generating a summary of conversation contents according to an embodiment of the present disclosure, the shortcoming of the related art in which a user needs to arduously scroll up to the last read part and read again in order to check missed conversation contents in a chat room including a plurality of participants may be addressed so as to minimize the user's inconvenience due to a scrolling operation.

The collecting the conversation texts may include converting and collecting an abbreviation included in the conversation texts into an original word.

The collecting the conversation texts may also include converting and collecting an emoticon included in the conversation texts into an emoticon text represented by the emoticon through image analysis of the emoticon.

The collecting the conversation texts may further include extracting and collecting a text tagged to the emoticon included in the conversation texts.

Through the collecting the conversation texts according to the present embodiment, the user may recognize the meaning of an abbreviation and emoticon so as to correctly determine a flow of a conversation in a chat room.

The providing the summary providing interface may include providing the summary providing interface for outputting a summary of the conversation texts falling within a range from a section in which a conversation text is not input by the user to a most recent section within the chat room.

The providing the summary providing interface may also include providing the summary providing interface for outputting a summary of the conversation texts falling within a range from a conversation text not read immediately before the user enters the chat room to a most recent conversation text.

The providing the summary providing interface may further include providing the summary providing interface for outputting the summary of the predetermined range of the conversation texts within the chat room when a touch-related operation signal among scrolling operation signals including a touch and drag operation for reviewing the past conversation text is received from the user within the user's chat room including the conversation participants.

Through the providing the summary providing interface according to the present embodiment, a summary request of a user may be determined and a summary providing interface may be provided when a touch-related signal among scrolling operation signals is received in a chat room so as to quickly respond to a response of the user.

The providing the summary providing interface may include providing an audio summary providing interface for outputting an audio summary of the predetermined range of the conversation texts within the chat room when the operation signal for reviewing the past conversation text is received from the user within the user's chat room including the conversation participants, and may further include generating an audio summary obtained by converting the summary into a sound in response to selection reception by the audio summary providing interface.

Through the providing the summary providing interface according to the present embodiment, auditory information about a summary may be provided along with visual information about the summary so that the user may check the summary in various ways.

The determining the keywords may include: decomposing the collected conversation texts into morphological units, and extracting at least one noun, at least one interrogative pronoun, and at least one word indicating a tense; and determining the at least one noun as the keywords, or extracting a word corresponding to an answer to the interrogative pronoun from the collected conversation texts to determine the extracted word as the keyword, or determining the word indicating the tense as the keyword.

Through the determining the keywords according to the present embodiment, a summary may be accurately generated by determining keywords in various ways.

A device for generating a summary of conversation contents according to an embodiment of the present disclosure may include: a collecting unit, which collects conversation texts input by a plurality of conversation participants in a chat room; a providing unit, which provides a summary providing interface for outputting a summary of a predetermined range of the conversation texts within the chat room when an operation signal for reviewing a past conversation text is received from the user within a user's chat room including the conversation participants; a determining unit, which determines keywords from the predetermined range of the conversation texts within the chat room in response to selection reception by the summary providing interface; a generating unit, which generates the summary as a sentence formed by reconstructing the keywords; and an exposing unit, which exposes the summary on a second surface different from a first surface on which the chat room is exposed, and overlays and exposes the second surface on the first surface.

By using the device for generating a summary of conversation contents according to an embodiment of the present disclosure, the shortcoming of the related art in which a user needs to arduously scroll up to the last read part and read again in order to check missed conversation contents in a chat room including a plurality of participants may be addressed so as to minimize the user's inconvenience due to a scrolling operation.

The collecting unit may convert and collect an abbreviation included in the conversation texts into an original word.

The collecting unit may convert and collect an emoticon included in the conversation texts into an emoticon text represented by the emoticon through image analysis of the emoticon.

The collecting unit may extract and collect a text tagged to an emoticon included in the conversation texts.

By using the collecting unit according to the present embodiment, the user may recognize the meaning of an abbreviation and emoticon so as to correctly determine a flow of conversation in a chat room.

The providing unit may provide the summary providing interface for outputting a summary of the conversation texts falling within a range from a section in which a conversation text is not input by the user to a most recent section within the chat room.

The providing unit may provide the summary providing interface for outputting a summary of the conversation texts falling within a range from a conversation text not read immediately before the user enters the chat room to a most recent conversation text.

The providing unit may provide the summary providing interface for outputting the summary of the predetermined range of the conversation texts within the chat room when a touch-related operation signal among scrolling operation signals including a touch and drag operation for reviewing the past conversation text is received from the user within the user's chat room including the conversation participants.

By using the providing unit according to the present embodiment, a summary request of a user may be determined and a summary providing interface may be provided when a touch-related signal among scrolling operation signals is received in a chat room so as to quickly respond to a response of the user.

The providing unit may provide an audio summary providing interface for outputting an audio summary of the predetermined range of the conversation texts within the chat room when the operation signal for reviewing the past conversation text is received from the user within the user's chat room including the conversation participants.

The generating unit may generate an audio summary obtained by converting the summary into a sound in response to selection reception by the audio summary providing interface.

By using the providing unit and the generating unit according to the present embodiment, auditory information about a summary may be provided along with visual information about the summary so that the user may check the summary in various ways.

The determining unit may decompose the collected conversation texts into morphological units, and extract at least one noun, at least one interrogative pronoun, and at least one word indicating a tense, and may determine the at least one noun as the keywords, or extract a word corresponding to an answer to the interrogative pronoun from the collected conversation texts to determine the extracted word as the keyword, or determine the word indicating the tense as the keyword.

By using the determining unit according to the present embodiment, a summary may be accurately generated by determining keywords in various ways.

In addition, other methods and other systems for implementing the present disclosure, and a computer-readable medium for storing a computer program for executing the above method may be further provided.

Other aspects and features of the present disclosure will become apparent from the detailed description and the claims in conjunction with the accompanying drawings.

BRIEF DESCRIPTION OF THE DRAWINGS

The above and other aspects and features of the present disclosure will become apparent from the detailed description of the following aspects in conjunction with the accompanying drawings.

DETAILED DESCRIPTION

Figure 1:
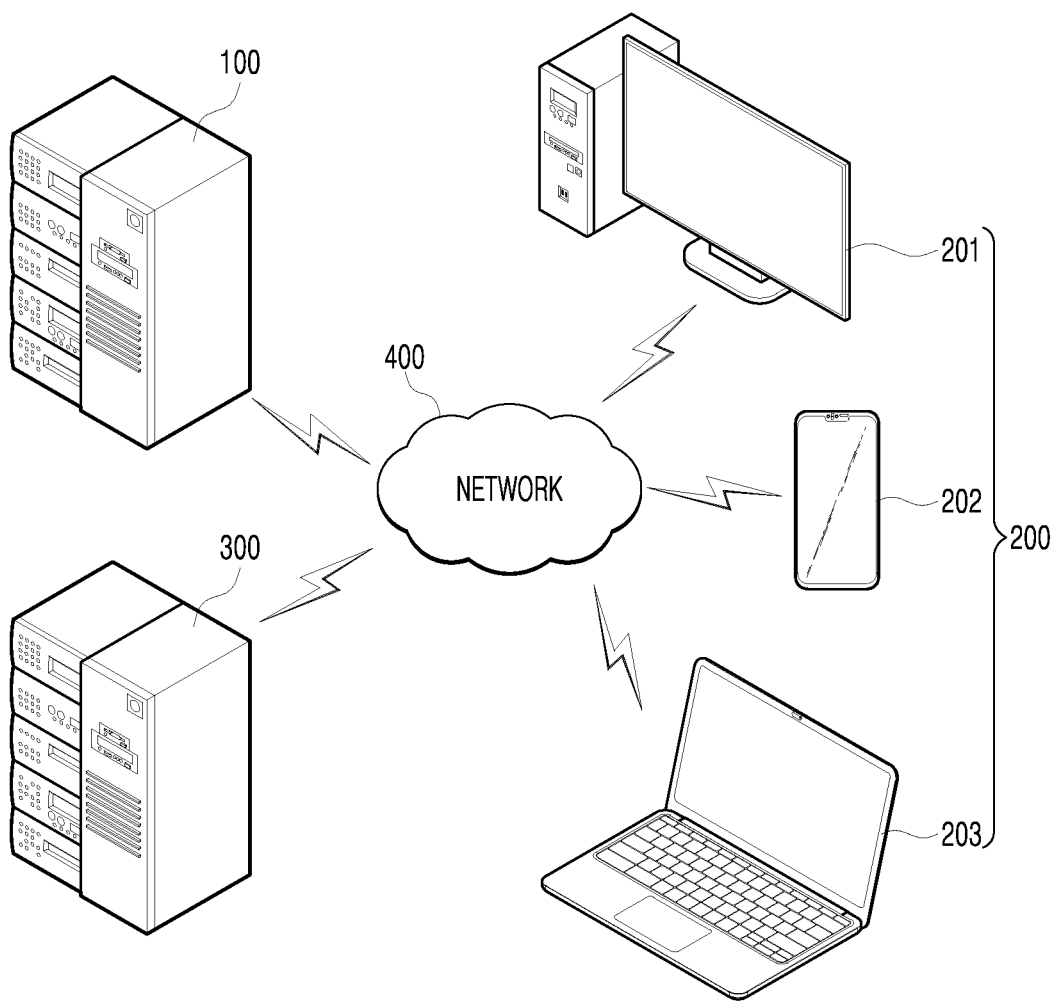
FIG. 1 is a diagram schematically illustrating a summary generating system according to an embodiment of the present disclosure.

Advantages and features of the present disclosure and methods for achieving them will become apparent from the descriptions of aspects hereinbelow with reference to the accompanying drawings. However, the present disclosure is not limited to the aspects disclosed herein but may be implemented in various different forms, and should be construed as including all modifications, equivalents, or alternatives that fall within the spirit and scope of the present disclosure. The aspects are provided to make the description of the present disclosure thorough and to fully convey the scope of the present disclosure to those skilled in the art. In relation to describing the present disclosure, when the detailed description of the relevant known technology is determined to unnecessarily obscure the gist of the present disclosure, the detailed description may be omitted.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. Although the terms first, second, etc. may be used herein to describe various elements, these elements should not be limited by these terms. These terms may be only used to distinguish one element from other elements.

Hereinafter, embodiments of the present disclosure will be described in detail with reference to the accompanying drawings. Like reference numerals designate like elements throughout the specification, and overlapping descriptions of the elements will not be provided.

FIG. 1 is a diagram schematically illustrating a summary generating system according to an embodiment of the present disclosure. Referring to FIG. 1, a summary generating system 1 may include a conversation contents summary generating device 100, a user terminal 200, a server 300, and a network 400.

The conversation contents summary generating device 100 may include an apparatus, which provides an Internet messenger and processes and provides predetermined information generated in the Internet messenger. The conversation contents summary generating device 100 may collect conversation texts input by a plurality of conversation participants in a chat room included in the Internet messenger.

The conversation contents summary generating device 100 may provide, within a user's chat room including conversation participants, a summary providing interface for outputting a summary of a predetermined range of a conversation text within the chat room when an operation signal for reviewing a past conversation text is received from the user. Here, the predetermined range of a conversation text may include a range from a section in which a conversation text is not input by the user to a most recent section within the chat room, or may include a range from a conversation text not read immediately before the user enters the chat room to a most recent conversation text.

Furthermore, the conversation contents summary generating device 100 may also provide, within the user's chat room including conversation participants, a summary providing interface for outputting a summary of a predetermined range of a conversation text within the chat room when a touch-related operation signal among scrolling operation signals including a touch and drag operation for reviewing a past conversation text is received from the user.

The conversation contents summary generating device 100 may also provide, within the user's chat room including conversation participants, an audio summary providing interface for outputting an audio summary of a predetermined range of a conversation text within the chat room when an operation signal for reviewing a past conversation text is received from the user.

The conversation contents summary generating device 100 may determine keywords from the predetermined range of a conversation text within the chat room in response to selection reception by the summary providing interface, and may generate a summary as a sentence formed by reconstructing the keywords. Here, the summary may include an audio summary. Furthermore, the summary may include a text as visual information, and the audio summary may include an audio file as auditory information.

The conversation contents summary generating device 100 may expose a summary on a second surface different from a first surface on which a chat room is exposed, and may overlay and expose the second surface on the first surface.

In the present embodiment, the conversation contents summary generating device 100 may be included in the user terminal 200. The user terminal 200 may receive a service for monitoring status information about the conversation contents summary generating device 100, or for operating or controlling the conversation contents summary generating device 100 through an authentication process after accessing an information processing application or information processing site. In the present embodiment, the user terminal 200 that has undergone the authentication process, for example, may determine an operation mode of the conversation contents summary generating device 100 to operate the conversation contents summary generating device 100 or control operation of the conversation contents summary generating device 100.

The user terminal 200 may include a communication terminal capable of executing a function of a computing device (not shown). In the present embodiment, the user terminal 200 may include, but is not limited to, a desktop computer 201, smartphone 202, notebook 203, tablet PC, smart TV, cell phone, personal digital assistant (PDA), laptop, media player, micro server, global positioning system (GPS) device, electronic book terminal, digital broadcast terminal, navigation device, kiosk, MP3 player, digital camera, home appliance, and other mobile or immobile computing devices operated by the user. Furthermore, the user terminal 200 may be a wearable terminal having a communication function and a data processing function, such as a watch, glasses, a hair band, or a ring. The user terminal 200 is not limited to the above-mentioned devices, and thus any terminal that supports web browsing may be adopted.

The server 300 may be a database server, which provides big data required for applying a variety of artificial intelligence algorithms and data related to voice recognition. Furthermore, the server 300 may include a web server or application server for controlling operation of the conversation contents summary generating device 100 by using an application or web browser installed in the user terminal 200.

Here, the artificial intelligence (AI), which is an area of computer engineering and information technology for studying methods for enabling computers to mimic thinking, learning, self-development, or the like that can be carried out with human intelligence, may represent enabling computers to mimic human intelligent behavior.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed. More specifically, machine learning is a technology that investigates and builds systems, and algorithms for such systems, which are capable of learning, making predictions, and enhancing their own performance on the basis of experiential data. Machine learning algorithms, rather than executing rigidly-set static program commands, may take an approach that builds a specific model based on input data for deriving a prediction or decision.

The server 300 may collect, from the conversation contents summary generating device 100, conversation texts input by a plurality of conversation participants in a chat room to determine keywords and generate a summary, and then may transmit the summary to the conversation contents summary generating device 100. Furthermore, the server 300 may collect, from the conversation contents summary generating device 100, conversation texts input by a plurality of conversation participants in a chat room to determine keywords and generate an audio summary, and then may transmit the audio summary to the conversation contents summary generating device 100.

The server 300 may log the contents of a conversation in a chat room using an optical character reader (OCR) or a natural language unit (NLU) in order to recognize a flow of a conversation text received from the conversation contents summary generating device 100. The server 300 may recognize a topic about a conversation text on the basis of a recurrent neural network (RNN) and hierarchical hidden Markov model, may determine keywords from the conversation text, and may generate a summary using deep learning on the basis of the determined keywords.

Furthermore, the server 300 may convert an abbreviation included in the conversation text received from the conversation contents summary generating device 100 into an original word using a deep neural network trained in advance to convert an abbreviation into an original word. Furthermore, the server 300 may convert an emoticon included in the conversation text received from the conversation contents summary generating device 100 into an emoticon text using a deep neural network trained in advance to convert an emoticon into an emoticon text.

According to a processing capability of the conversation contents summary generating device 100, at least a portion of the determination of keywords and generation of a summary from a conversation text, the determination of keywords and generation of an audio summary from a conversation text, the conversion from an abbreviation included in a conversation text into an original word, and the conversion from an emoticon included in a conversation text into an emoticon text may be performed by the conversation contents summary generating device 100.

The network 400 may serve to connect the conversation contents summary generating device 100, the user terminal 200, and the server 300. The network 400 may include, for example, wired networks such as local area networks (LANs), wide area networks (WANs), metropolitan area networks (MANs), and integrated service digital networks (ISDNs), or wireless networks such as wireless LANs, CDMA, Bluetooth, and satellite communication, but the scope of the present disclosure is not limited thereto. Furthermore, the network 400 may transmit and receive information using short-range communications or long-distance communications. Here, the short-range communications may include Bluetooth, radio frequency identification (RFID), infrared data association (IrDA), ultra-wideband (UWB), ZigBee, and wireless fidelity (Wi-Fi) technology. The long-distance communications may include code division multiple access (CDMA), frequency division multiple access (FDMA), time division multiple access (TDMA), orthogonal frequency division multiple access (OFDMA), and single carrier frequency division multiple access (SC-FDMA) technology.

The network 400 may include a connection of network elements such as a hub, a bridge, a router, a switch, and a gateway. The network 400 may include one or more connected networks, for example, a multi-network environment, including a public network such as the Internet and a private network such as a secure corporate private network. Access to the network 400 may be provided via one or more wired or wireless access networks. Furthermore, the network 400 may support the Internet of things (IoT) for 5G communication or exchanging and processing information between distributed elements such as objects.

Figure 2:
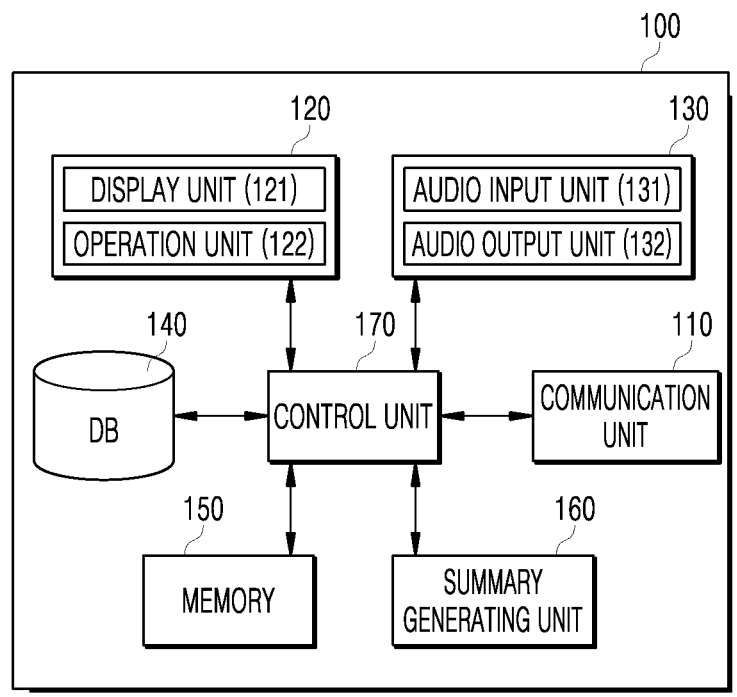
FIG. 2 is a diagram schematically illustrating a detailed configuration of the conversation contents summary generating device in the summary generating system of FIG. 1.

FIG. 2 is a diagram schematically illustrating a detailed configuration of the conversation contents summary generating device in the summary generating system of FIG. 1. Descriptions which overlap with the above descriptions related to FIG. 1 are not provided below. Referring to FIG. 2, the conversation contents summary generating device 100 may include a communication unit 110, a user interface unit 120 including a display unit 121 and an operation unit 122, an audio processing unit 130 including an audio input unit 131 and an audio output unit 132, a database 140, a memory 150, a summary generating unit 160, and a control unit 170.

The communication unit 110 may interwork with the network 400 to provide a communication interface required for providing, in a form of packet data, transmission and reception signals between the conversation contents summary generating device 100, the user terminal 200, and the server 300. Furthermore, the communication unit 110 may serve to receive a predetermined information request signal from the user terminal 200, and may serve to transmit information processed by the conversation contents summary generating device 100 to the user terminal 200. Furthermore, the communication unit 110 may transmit the predetermined information request signal from the user terminal 200 to the server 300, may receive a response signal processed by the server 300, and may transmit the response signal to the user terminal 200. Furthermore, the communication unit 110 may be a device including hardware and software required for transmitting and receiving signals such as a control signal and a data signals via a wired or wireless connection to another network device.

Furthermore, the communication unit 110 may support a variety of object-to-object intelligent communication, for example, Internet of things (IoT), Internet of everything (IoE), and Internet of small things (IoST), and may support, for example, machine to machine (M2M) communication, vehicle to everything (V2X) communication, and device to device (D2D) communication.

The display unit 121 of the user interface unit 120 may be controlled by the control unit 170 to display an operation status of the conversation contents summary generating device 100, in other words, a summary or situation of a conversation between a plurality of conversation participants in a chat room. According to an embodiment, the display unit 121 may form a layered structure with a touch pad so as to be configured as a touch screen. In this case, the display unit 121 may also be used as the operation unit 122 capable of inputting information in response to a touch of a user. To this end, the display unit 121 may be configured with a touch-sensitive display controller or other various input and output controllers. For example, the touch-sensitive display controller may provide an output interface and an input interface between an apparatus and a user. The touch-sensitive display controller may transmit and receive electric signals to and from the control unit 170. Furthermore, the touch-sensitive display controller displays a visual output to the user, wherein the visual output may include a text, graphic, image, video, and a combination thereof. The display unit 121 may be a predetermined display member such as, for example, a touch-sensitive organic light emitting display (OLED), liquid crystal display (LCD), or light emitting display (LED).

The operation unit 122 of the user interface unit 120 may have a plurality of operation buttons (not shown) to transmit signals corresponding to the buttons to the control unit 170. This operation unit 122 may be configured with a sensor, button, or switch structure capable of recognizing a touch or pressing operation of the user. In the present embodiment, the operation unit 122 may transmit, to the control unit 170, an operation signal operated by the user to check or change a variety of information related to operation of the conversation contents summary generating device 100 and displayed on the display unit 121. In the present embodiment, in the case where the conversation contents summary generating device 100 is included in the user terminal 200, the user interface unit 120 may be replaced with a display unit (not shown) and operation unit (not shown) of the user terminal 200.

The audio input unit 131 of the audio processing unit 130 may receive an input of a voice to transmit the voice to the control unit 170, and may transmit utterance information of the user to the summary generating unit 160 so that a voice recognition process may be executed. To this end, the audio input unit 131 may be provided with at least one microphone (not shown). Furthermore, the audio input unit 131 may be provided with a plurality of microphones (not shown) to more accurately receive a spoken utterance. Here, the plurality of microphones may be spaced apart from each other so as to be arranged at different positions, and may process a received spoken utterance of the user into an electric signal.

In an optional embodiment, the audio input unit 131 may use various noise elimination algorithms for eliminating noise generated while receiving a voice of the user. In an optional embodiment, the audio input unit 131 may include various elements for processing an audio signal, such as a filter (not shown) for eliminating noise when receiving the voice of the user and an amplifier (not shown) for amplifying and outputting a signal output from the filter.

Furthermore, in response to control by the control unit 170, the audio output unit 132 of the audio processing unit 130 may output, for example, a warning sound, an operation mode, an operation status, a notification message pertaining to an error status, and a processing result corresponding to a voice (voice command) of the user in an audio form. In the present embodiment, the audio output unit 132 may output an audio summary generated by the summary generating unit 160. The audio output unit 132 may convert an electric signal received from the control unit 170 into an audio signal, and may output the audio signal. To this end, the audio output unit may be provided with, for example, a speaker.

In the present embodiment, in the case where the conversation contents summary generating device 100 is included in the user terminal 200, the audio processing unit 130 may be replaced with an audio input unit (not shown) and audio output unit (not shown) of the user terminal 200.

The database 140 may include a management database for storing information collected and generated by the conversation contents summary generating device 100. Here, the management database may store conversation texts collected from a user's chat room including conversation participants. These conversation texts may include an abbreviation and an emoticon. Furthermore, the management database may store keywords determined from a conversation text, a summary as a sentence in which the keywords are reconstructed, and an audio summary obtained by converting the sentence in which the keywords are reconstructed into an audio signal.

The database 140 may further include a user database for storing user information. Here, the user database may include participant information, such as ID, about participants in a chat room, and user information about a user to be provided with a summary. Here, the user information may include: basic information about an object such as name, affiliation, personal data, gender, age, contact information, email, and address; authentication (login) information such as an ID (or email) and a password; and access-related information such as an access country, an access location, information about a device used for access, and an accessed network environment.

The memory 150 may store a variety of information required for operating the conversation contents summary generating device 100, such as a summary providing interface, a summary generation range, and structures of a first and second surfaces, and may include a volatile or non-volatile recording medium. Furthermore, the memory 150 may store control software for operating the conversation contents summary generating device 100. Furthermore, the memory 150 may store a preset start word for determining whether a start word is present from the voice of the user. The start word may be set by a manufacturer. For example, "Hi, LG" may be set as the start word, and may be set and changed by the user. This start word is input in order to activate a voice recognition function of the conversation contents summary generating device 100, and the conversation contents summary generating device 100 that has recognized the start word uttered by the user may switch to a voice recognition function activated state.

Here, the memory 150 may include magnetic storage media or flash storage media, but the scope of the present disclosure is not limited thereto. This memory 150 may include an internal memory and an external memory, and may include: a volatile memory such as a DRAM, SRAM, or SDRAM; a non-volatile memory such as a one time programmable ROM (OTPROM), PROM, EPROM, EEPROM, mask ROM, flash ROM, NAND flash memory, or NOR flash memory; and a storage device such as an HDD or a flash drive such as an SSD, compact flash (CF) card, SD card, micro-SD card, mini-SD card, Xd card, or a memory stick.

Here, a simple voice recognition may be performed by the conversation contents summary generating device 100, and a high-level voice recognition such as natural language processing may be performed by the server 300. For example, when the preset start word is included in the voice of the user, the conversation contents summary generating device 100 may activate the voice recognition function, and may switch to a state for receiving a voice command from the user. In this case, the conversation contents summary generating device 100 may only execute a voice recognition process for determining whether the start word is input, and thereafter, voice recognition for recognizing a user command may be executed via the server 300. Since system resources of the conversation contents summary generating device 100 are limited, complicated natural language recognition and processing may be executed via the server 300.

The summary generating unit 160 may collect conversation texts input by a plurality of conversation participants in a chat room. The summary generating unit 160 may provide, within a user's chat room including conversation participants, a summary providing interface for outputting a summary of a predetermined range of a conversation text within the chat room when an operation signal for reviewing a past conversation text is received from the user.

The summary generating unit 160 may determine keywords from the predetermined range of a conversation text within the chat room in response to selection reception by the summary providing interface, and may generate a summary as a sentence formed by reconstructing the keywords. Here, the summary may include an audio summary. The summary generating unit 160 may expose a summary on a second surface different from a first surface on which a chat room is exposed, and may overlay and expose the second surface on the first surface.

In the present embodiment, the summary generating unit 160 may interwork with the control unit 170 to perform learning or receive a learning result from the control unit 170. In the present embodiment, the summary generating unit 160 may be provided outside the control unit 170 as illustrated in FIG. 2, or may be provided in the control unit 170 to operate like the control unit 170, or may be provided in the server 300 of FIG. 1. The summary generating unit 160 will be described in detail with reference to FIG. 3.

The control unit 170, which is a type of central processing unit, may control overall operation of the summary generating device 100 by running control software installed in the memory 150. The control unit 170 may include any type of device capable of processing data, such as a processor. Here, the term "processor" may represent, for example, a hardware-embedded data processing device having a physically structured circuit to execute functions expressed as instructions or codes included in a program. Examples of the hardware-embedded data processing device may include a microprocessor, a central processing unit (CPU), a processor core, a multiprocessor, an application-specific integrated circuit (ASIC), and a field programmable gate array (FPGA), but the scope of the present disclosure is not limited thereto.

In the present embodiment, the control unit 170 may perform machine learning such as deep learning on a collected conversation text so that the conversation contents summary generating device 100 may generate and output an optimal summary, and the memory 150 may store, for example, data used in the machine learning and result data.

Deep learning, which is a subfield of machine learning, enables data-based learning through multiple layers. As the number of layers in deep learning increases, the deep learning network may acquire a collection of machine learning algorithms that extract core data from multiple datasets.

Deep learning structures may include an artificial neural network (ANN), and may include a convolutional neural network (CNN), a recurrent neural network (RNN), a deep belief network (DBN), and the like. The deep learning structure according to the present embodiment may use various structures well known in the art. For example, the deep learning structure according to the present disclosure may include a CNN, an RNN, a DBN, and the like. RNN is an artificial neural network structure which is formed by building up layers at each instance, and which is heavily used in natural language processing and the like and effective for processing time-series data which vary over a course of time. A DBN includes a deep learning structure formed by stacking up multiple layers of a deep learning scheme, restricted Boltzmann machines (RBM). A DBN has the number of layers formed by repeating RBM training. A CNN includes a model mimicking a human brain function, built under the assumption that when a person recognizes an object, the brain extracts the most basic features of the object and recognizes the object based on the results of complex processing in the brain.

Meanwhile, the artificial neural network can be trained by adjusting connection weights between nodes (if necessary, adjusting bias values as well) so as to produce desired output from given input. Also, the artificial neural network can continuously update the weight values through learning. Furthermore, methods such as back propagation may be used in training the artificial neural network.

As described above, the control unit 170 may be provided with an artificial neural network and perform machine learning-based user recognition and user's voice recognition using received audio input signals as input data.

The control unit 170 may include an artificial neural network, for example, a deep neural network (DNN) and train the DNN, and examples of the DNN include CNN, RNN, DBN, and so forth. As a machine learning method for such an artificial neural network, both unsupervised learning and supervised learning may be used. The control unit 170 may control to have a tone artificial neural network structure to be updated after learning.

Figure 3:
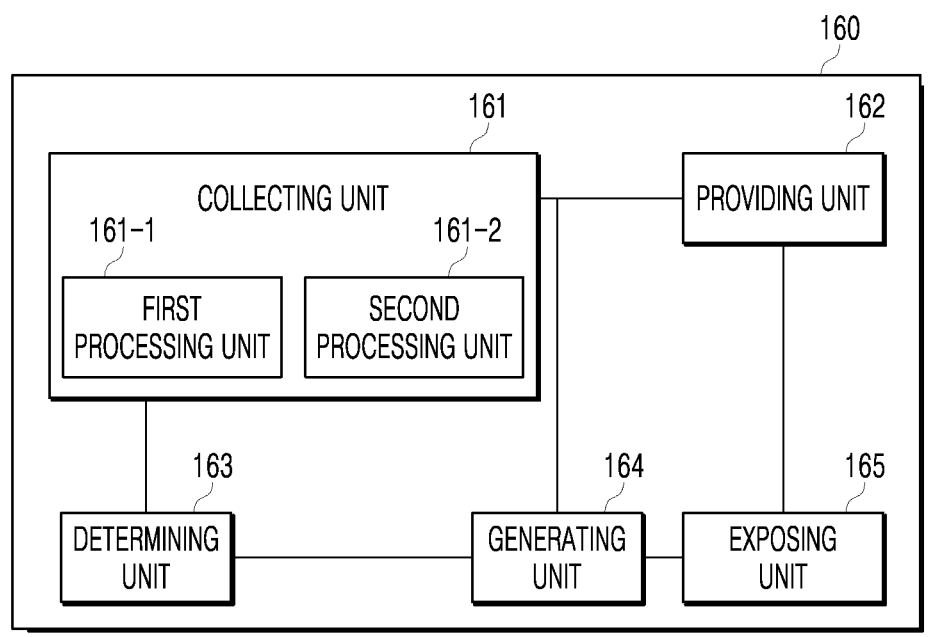
FIG. 3 is a diagram schematically illustrating a detailed configuration of the summary generating unit in the conversation contents summary generating device of FIG. 2.

FIG. 3 is a diagram schematically illustrating a detailed configuration of the summary generating unit in the conversation contents summary generating device of FIG. 2. Descriptions which overlap with the above descriptions related to FIGS. 1 and 2 are not provided below. Referring to FIG. 3, the summary generating unit 160 may include a collecting unit 161, a providing unit 162, a determining unit 163, a generating unit 164, and an exposing unit 165.

The collecting unit 161 may collect conversation texts input by a plurality of conversation participants in a chat room. Here, when collecting the conversation texts in the chat room, the collecting unit 161 may also collect ID information about the participants who input the conversation texts so as to identify who has input a conversation text. In the present embodiment, the collecting unit 161 may include a first processing unit 161-1 and a second processing unit 161-2.

The first processing unit 161-1 may convert an abbreviation included in a conversation text into an original word. The first processing unit 161-1 may recognize context of a conversation before and after an abbreviation, and may use a textual entailment recognition algorithm and a paraphrase recognition algorithm to recognize an unabbreviated text and convert the abbreviation into an original word.

Here, the textual entailment recognition algorithm, which is used to determine whether one of two texts to be compared can be inferred from the other text, may be divided into word-based textual entailment recognition and sentence-based textual entailment recognition. The word-based textual entailment recognition is a method for recognizing the entailment of a sentence by dividing the sentence into words or several character units and using characteristics of each word. For example, when performing bag-of-words-based textual entailment recognition on the two sentences "Hong-gildong-eun hakgyo-leul dani-neun haksaeng-ida" and "Hong-gildong-eun haksaeng-ida," the sentence "Hong-gildong-eun hakgyo-leul dani-neun haksaeng-ida" is divided into "Hong-gildong," "-eun," "hakgyo," "-leul," "danida," "-neun," "haksaeng," and "-ida," and the sentence "Hong-gildong-eun haksaeng-ida" is divided into "Hong-gildong," "-eun," "haksaeng," and "-ida," and thus it may be determined that the sentences "Hong-gildong-eun hakgyo-leul dani-neun haksaeng-ida" and "Hong-gildong-eun haksaeng-ida" have four matching words. Furthermore, for example, when performing bi-gram-based textual entailment recognition on the two sentences "Hong-gildong-eun hakgyo-leul dani-neun haksaeng-ida" and "Hong-gildong-eun haksaeng-ida," the sentence "Hong-gildong-eun hakgyo-leul dani-neun haksaeng-ida" is divided into "Hong-gildong-eun," "-eun hakgyo," "hakgyo-leul," "leul-danida," "dani-neun," "-eun haksaeng," and "haksaeng-ida," and the sentence "Hong-gildong-eun haksaeng-ida" is divided into "Hong-gildong-eun," "-eun haksaeng," and "haksaeng-ida," and thus it may be determined that the sentences "Hong-gildong-eun hakgyo-leul dani-neun haksaeng-ida" and "Hong-gildong-eun haksaeng-ida" have three matching words. Furthermore, for example, when performing longest-matching-based textual entailment recognition on the two sentences "Hong-gildong-eun hakgyo-leul dani-neun haksaeng-ida" and "Hong-gildong-eun haksaeng-ida," the sentence "Hong-gildong-eun hakgyo-leul dani-neun haksaeng-ida" is divided into "Hong-gildong-eun," "hakgyo-leul," "dani-neun," and "haksaeng-ida," and the sentence "Hong-gildong-eun haksaeng-ida" is divided into "Hong-gildong-eun" and "haksaeng-ida," and thus it may be determined that the sentences "Hong-gildong-eun hakgyo-leul dani-neun haksaeng-ida" and "Hong-gildong-eun haksaeng-ida" have two matching words. Meanwhile, the word-based textual entailment recognition may improve a recognition rate by using a lexical network. The sentence-based textual entailment recognition is a method for recognizing an entailment using morphological analysis and dependency parsing. The dependency parsing (or dependency grammar) is a method for analyzing a sentence by recognizing a dependency relationship (for example, sufficiency, necessity, equivalence, and partial equivalence) between a language element and another language element constituting the sentence, wherein the language element may be regarded as a morpheme or a separate word unit in the case of the Korean language.

The paraphrase recognition algorithm is a recognition method for detecting, for example, different types of sentences or phrases having the same meaning in a text. For example, if a predetermined condition is satisfied when bidirectional textual entailment recognition is performed on two texts, the two texts may be considered to have a paraphrase relationship. For example, when the paraphrase recognition algorithm is applied to the two sentences "Young-Hee is a person" and "Young-Hee is a human being," the two sentences have a true value for the paraphrase relationship when recognizing the textual entailment of "Young-Hee is a person" to "Young-Hee is a human being" and also have a true value for the paraphrase relationship when recognizing the textual entailment of "Young-Hee is a person" to "Young-Hee is a human being," and thus the two sentences may be determined to have the paraphrase relationship.

The first processing unit 161-1 may convert an abbreviation included in a collected conversation text into an original word using a deep neural network trained in advance to convert an abbreviation into an original word. For example, when "ok," "congrats," and "idk" are included in a conversation text, the first processing unit 161-1 may convert the abbreviations into "okay," "congratulations," and "I don't know" respectively, through abbreviation learning. As another example, when an answer to the conversation text "Could you finish the task by 3 o'clock today?" is "ok," the first processing unit 161-1 may convert the abbreviation "ok" into "okay."

The second processing unit 161-2 may analyze an image of an emoticon included in a conversation text to convert the emoticon into an emoticon text represented by the emoticon. Here, the term "emoticon" may be a portmanteau word of the words "emotion" and "icon." Emoticons are used to quickly express a feeling or mood without using letters, and may also amuse a person receiving emoticons. Therefore, although expressed in different ways in different countries, new emoticons are being made one after another, and a large number of emoticons are used as Internet language in Korea. Representative emoticons include the following examples. "^_^" represents a smiling face, "*^^*" represents a pleasant expression, "^^;" represents a shy smile, ".( )." represents a satisfied expression, "?.?" represents nonsense, ":-)" represents a good mood, and ":-(" represents a bad mood. Recently, emoticons expressed as various images have been generated and used in chat rooms.

The second processing unit 161-2 may perform image analysis on an emoticon included in a conversation text by using an image classification algorithm to recognize the image, and may convert the emoticon back to a corresponding text. The second processing unit 161-2 may convert an emoticon included in the conversation text received from the conversation contents summary generating device 100 into an emoticon text using a deep neural network trained in advance to convert an emoticon into an emoticon text.

In an optional embodiment, the second processing unit 161-2 may extract a text tagged to the emoticon included in the conversation text. An arbitrary emoticon may be tagged with a text indicating a status of an emoticon, and, in this case, the second processing unit 161-2 may extract a text indicating the status of the emoticon.

The providing unit 162 may provide, within a user's chat room including conversation participants, a summary providing interface for outputting a summary of a predetermined range of a conversation text within the chat room when an operation signal for reviewing a past conversation text is received from the user. Furthermore, the providing unit 162 may also provide, within the user's chat room including conversation participants, an audio summary providing interface for outputting an audio summary of a predetermined range of a conversation text within the chat room when an operation signal for reviewing a past conversation text is received from the user.

Here, the operation signal for reviewing a past conversation text may include scrolling operation signals including a touch and drag operation for reviewing a past conversation text from the user within the user's chat room including conversation participants, and the providing unit 162 may provide the summary providing interface or audio summary providing interface when a touch-related operation signal among the scrolling operation signals is received. Furthermore, the predetermined range of a conversation text may include a range from a section in which a conversation text is not input by the user to a most recent section within the chat room. Furthermore, the predetermined range of a conversation text may include a range from a conversation text not read immediately before the user enters the chat room to a most recent conversation text. For example, in the case of KakaoTalk messenger application, a number "1" is displayed next to a conversation text before the user enters a chat room, and when the user enters the chat room, the number "1" disappears. Therefore, the range from a conversation text not read immediately before the user enters a chat room to a most recent conversation text may be set as the predetermined range for generating a summary.

The determining unit 163 may determine keywords from the predetermined range of a conversation text within a chat room in response to selection reception by the summary providing interface or audio summary providing interface. Before the above determination, the determining unit 163 may log the contents of a conversation in a chat room using an optical character reader (OCR) or natural language unit (NLU) in order to recognize a flow of a received conversation text. The determination 163 may recognize a topic about a conversation text on the basis of a recurrent neural network (RNN) and hierarchical hidden Markov model, and may determine keywords from the conversation text.

Various techniques may be used for the determining unit 163 to determine keywords from a conversation text. For example, the determining unit 163 may decompose a conversation text into morphological units, and then may determine nouns as keywords. Words attached to pre-stored particles (for example, "eun," "neon," "i," "ga," and "ui,") may be regarded as nouns. Alternatively, the determining unit 163 may decompose a conversation text into morphological units, and then may extract an interrogative pronoun to determine, as a keyword, a word corresponding to an answer to a question including the interrogative pronoun. Alternatively, the determining unit 163 may decompose a conversation text into morphological units, and then may determine words indicating a tense as keywords. Interrogative pronouns or a group of words indicating a tense may be stored in advance.

For example, when a user A inputs the text "Do you remember when and where we are supposed to meet today?" after users A and B have had a conversation about a meeting time and location the previous day in a chat room, the determining unit 163 may extract interrogative pronouns such as "when," "what," and "where" from the conversation text, and may determine words corresponding to answers to the question including the interrogative pronouns as keywords. Furthermore, the determining unit 163 may extract a word indicating a tense, such as "today," from a conversation text, and may determine the extracted word as a keyword.

The determining unit 163 may compare exposure frequencies of keywords determined within a conversation text, and may determine, as a core keyword, a determined keyword that has been exposed at least a preset number of times (for instance, five times) within the conversation text.

The generating unit 164 may generate a summary as a sentence formed by reconstructing determined core keywords. The generating unit 164 may extract sentences including core keywords from a conversation text, and may calculate a confidence value from a distribution of core keywords for each of the extracted sentences. Here, the confidence value may be a value determined in proportion to the number of core keywords in each sentence. The generating unit 164 may compare the confidence value calculated for each sentence with a preset threshold value to generate a summary by extracting a sentence having a confidence value equal to or larger than the preset threshold value.

In an optional embodiment, the generating unit 164 may generate a summary as a sentence formed by reconstructing determined core keywords, and may generate an audio summary obtained by converting the summary into a sound.

Here, the audio summary may include an audio file obtained by text-to-speech (TTS) conversion of a summary, and the generating unit 164 may further have a TTS conversion function.

The exposing unit 165 may expose a summary on a second surface different from a first surface on which a chat room is exposed, and may overlay and expose the second surface on the first surface. Here, the first surface may include, for example, a single entire screen on the display unit 121 or a screen (not shown) of the user terminal 200. Although the second surface is displayed together with the first surface, the second surface may include a partial screen smaller than the first surface and disposed on a certain portion of the first surface. In the present embodiment, the first surface and the second surface may have different resolutions. For example, the first surface may have a resolution of 1280×720, and the second surface may have a resolution of 640×480. Since the first surface and the second surface are displayed together by the exposing unit 165, the user may check a summary exposed on the second surface while viewing a state of a chat room exposed on the first surface.

Figure 4:
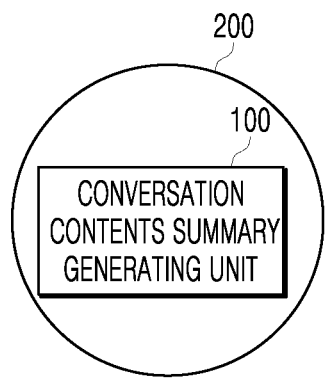
FIG. 4 is a diagram schematically illustrating a summary generating system according to another embodiment of the present disclosure.

FIG. 4 is a diagram schematically illustrating a summary generating system according to another embodiment of the present disclosure. Descriptions which overlap with the above descriptions related to FIGS. 1 to 3 are not provided below.

Referring to FIG. 4, the conversation contents summary generating device 100 may be included in the user terminal 200. There are various methods for including the conversation contents summary generating device 100 in the user terminal 200. In a specific embodiment, the conversation contents summary generating device 100 may be installed via a communication network, and, for example, the conversation contents summary generating device 100 may be installed as an application in the user terminal 200. In another specific embodiment, the conversation contents summary generating device 100 may be installed offline in the user terminal 200. However, an embodiment of the present disclosure is not limited to the above exemplary embodiments, and the conversation contents summary generating device 100 may be installed in various forms in the user terminal 200.

Figure 5:
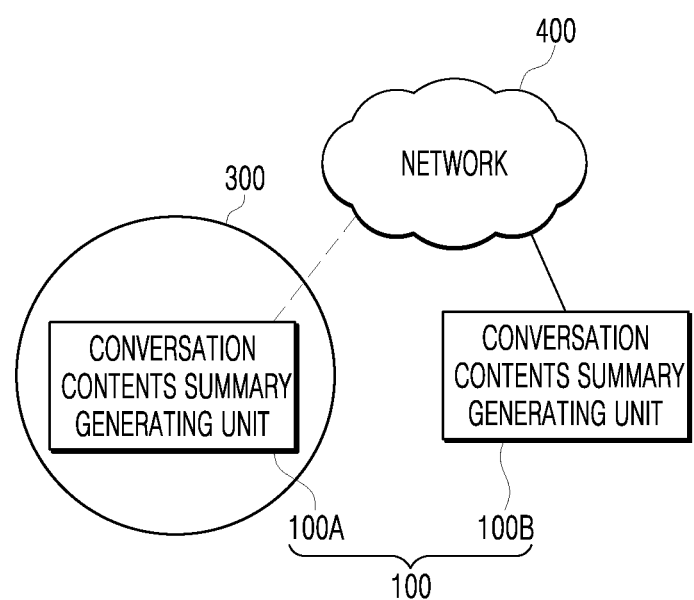
FIG. 5 is a diagram schematically illustrating a summary generating system according to another embodiment of the present disclosure.

FIG. 5 is a diagram schematically illustrating a summary generating system according to another embodiment of the present disclosure. Descriptions which overlap with the above descriptions related to FIGS. 1 to 4 are not provided below. Referring to FIG. 5, a part 100A of the conversation contents summary generating device 100 may be included in the server 300, and another part 100B may be connected to the server 300 via the network 400.

For example, the part 100A including the first processing unit 161-1, the second processing unit 161-2, the determining unit 163, and the generating unit 164 among the members of the conversation contents summary generating device 100 illustrated in FIGS. 1 to 3 may be included in the server 300. A method for including the part 100A of the conversation contents summary generating device 100 in the server 300 is the same as described above with reference to FIG. 4, and is thus not described below. The other part 100B including the providing unit 162 and the exposing unit 165 among the members of the conversation contents summary generating device 100 illustrated in FIGS. 1 to 3 may be connected to the server 300 via the network 400.

Although the providing unit 162 and the exposing unit 165 among the members of the conversation contents summary generating device 100 are connected as the part 100B to the server 300 via the network 400 in the present embodiment, this is merely one example, and an embodiment of the present disclosure is not limited thereto. That is, at least one among the plurality of members included in the conversation contents summary generating device 100 may be selectively connected to the server 300 via the network 400.

Figure 6:
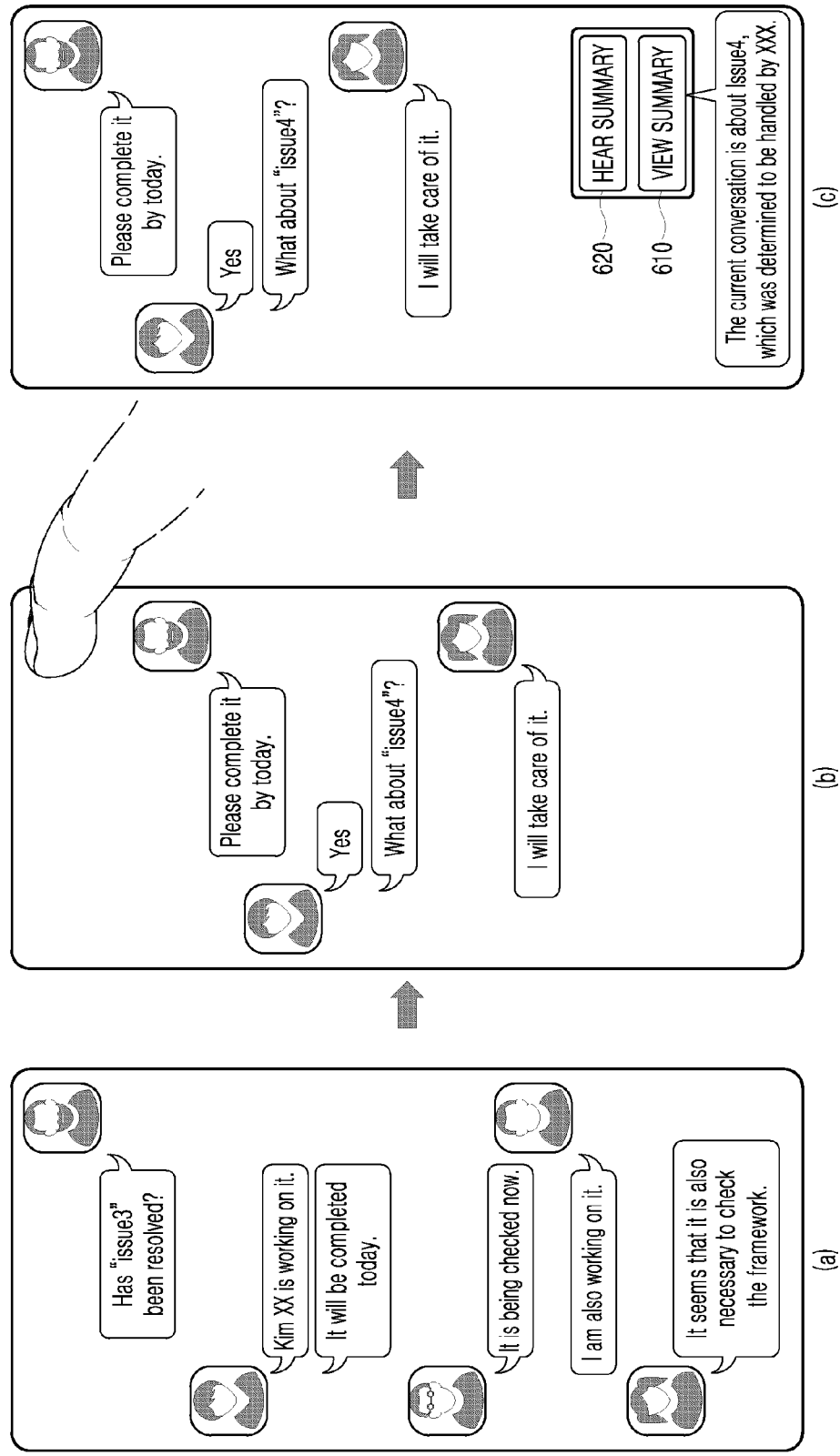
FIG. 6 is a diagram schematically illustrating summary processing in a chat room according to an embodiment of the present disclosure.

FIG. 6 is a diagram schematically illustrating summary processing in a chat room according to an embodiment of the present disclosure. Descriptions which overlap with the above descriptions related to FIGS. 1 to 5 are not provided below.

FIG. 6A illustrates a state in which a plurality of conversation participants converse in a chat room of the user terminal 200.

FIG. 6B illustrates a state in which the user performs a scrolling operation including a touch and drag operation in order to review a past conversation text because the user momentarily looked off the screen or briefly did another action and thus could not follow the conversation.

FIG. 6C illustrates a state in which a touch operation signal is received, and a summary providing interface 610 (view summary) and an audio summary providing interface 620 (hear summary) for outputting a summary of a predetermined range of a conversation text in a chat room are provided. Furthermore, FIG. 6C illustrates a result of outputting a summary in response to selection reception by the summary providing interface 610.

Figure 7:
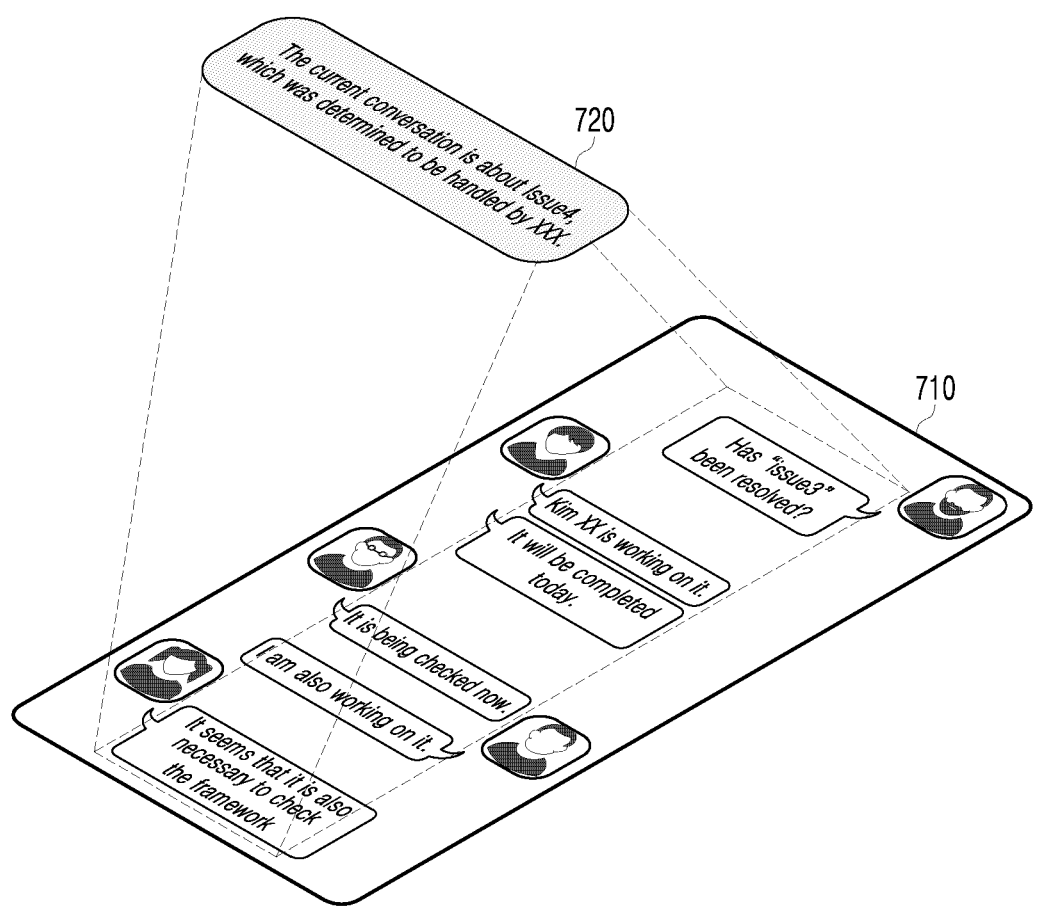
FIG. 7 is a diagram schematically illustrating chat room and summary exposure according to an embodiment of the present disclosure.

FIG. 7 is a diagram schematically illustrating chat room and summary exposure according to an embodiment of the present disclosure. Descriptions which overlap with the above descriptions related to FIGS. 1 to 6 are not provided below.

FIG. 7 illustrates a state in which the summary generating unit 160 exposes a first surface 710 and a second surface 720 in a chat room. The first surface 710 may expose the chat room in which a conversation takes place, and the second surface 720 that is different from the first surface 710 may expose a summary generated in response to selection by the summary providing interface 610. Here, the first surface 710 may include, for example, a single entire screen on the display unit 121 or a screen (not shown) of the user terminal 200. Although the second surface 720 is displayed together with the first surface 710, the second surface 720 may include a partial screen smaller than the first surface 710 and disposed on a certain portion of the first surface 710.

Figure 8:
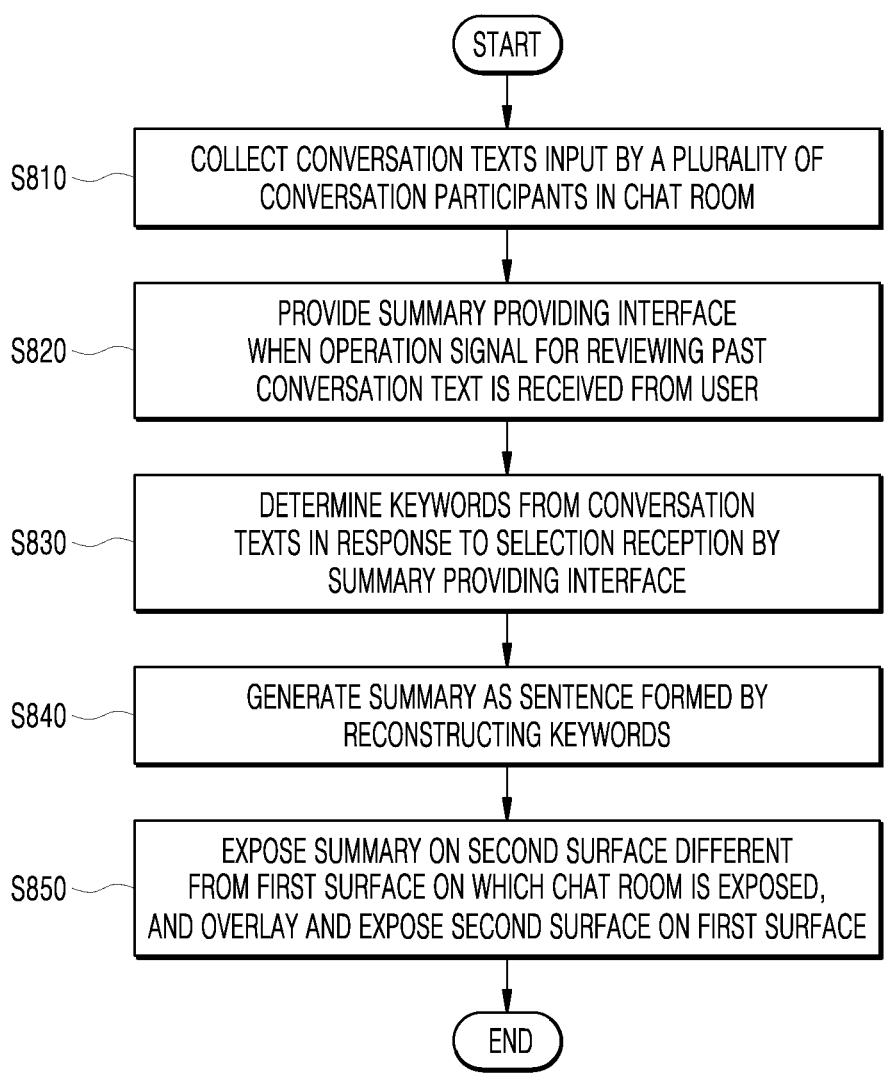
FIG. 8 is a flowchart illustrating a method for generating a conversation contents summary according to an embodiment of the present disclosure.

FIG. 8 is a flowchart illustrating a method for generating a conversation contents summary according to an embodiment of the present disclosure. Descriptions which overlap with the above descriptions related to FIGS. 1 to 6 are not provided below.

Referring to FIG. 8, in operation S810, the conversation contents summary generating device 100 collects conversation texts input by a plurality of conversation participants in a chat room. Here, when collecting the conversation texts in the chat room, the conversation contents summary generating device 100 may also collect ID information of the participants inputting the conversation texts so as to identify who has input a conversation text. The conversation contents summary generating device 100 may convert an abbreviation included in a collected conversation text into an original word using a deep neural network trained in advance to convert an abbreviation into an original word. The conversation contents summary generating device 100 may convert an emoticon included in the conversation text received from the conversation contents summary generating device 100 into an emoticon text using a deep neural network trained in advance to convert an emoticon into an emoticon text. The conversation contents summary generating device 100 may extract a text tagged to the emoticon included in the conversation text.

In operation S820, the conversation contents summary generating device 100 provides, within the user's chat room including conversation participants, a summary providing interface for outputting a summary of a predetermined range of a conversation text within the chat room when an operation signal for reviewing a past conversation text is received from the user. In an optional embodiment, the conversation contents summary generating device 100 may provide an audio summary providing interface for outputting an audio summary of a predetermined range of a conversation text within the user's chat room, when an operation signal for reviewing a past conversation text is received from the user. Here, the operation signal for reviewing a past conversation text may include scrolling operation signals including a touch and drag operation by the user, and the conversation contents summary generating device 100 may provide the summary providing interface or audio summary providing interface when a touch-related operation signal among the scrolling operation signals is received. Furthermore, the predetermined range of a conversation text may include a range from a section in which a conversation text is not input by the user to a most recent section within the chat room, or may include a range from a conversation text not read immediately before the user enters the chat room to a most recent conversation text.

In operation S830, the conversation contents summary generating device 100 determines keywords from the predetermined range of a conversation text within the chat room in response to selection reception by the summary providing interface. The conversation contents summary generating device 100 may log the contents of a conversation in the chat room using an optical character reader (OCR) or natural language unit (NLU) in order to recognize a flow of a received conversation text. Furthermore, the conversation contents summary generating device 100 may recognize a topic about a conversation text on the basis of a recurrent neural network (RNN) and hierarchical hidden Markov model, and may determine keywords from the conversation text. The conversation contents summary generating device 100 may determine nouns as keywords after decomposing a conversation text into morphological units, or may extract an interrogative pronoun to determine, as a keyword, a word corresponding to an answer a question including the interrogative pronoun after decomposing a conversation text into morphological units, or may determine words indicating a tense as keywords after decomposing a conversation text into morphological units. The conversation contents summary generating device 100 may compare exposure frequencies of keywords determined within a conversation text, and may determine, as a core keyword, a determined keyword that has been exposed at least a preset number of times (for instance, five times) within the conversation text.

In operation S840, the conversation contents summary generating device 100 may generate a summary as a sentence formed by reconstructing keywords. The conversation contents summary generating device 100 may extract sentences including core keywords from a conversation text, and may calculate a confidence value from a distribution of core keywords for each of extracted sentences. Here, the confidence value may be a value determined in proportion to the number of core keywords in each sentence. The conversation contents summary generating device 100 may compare the confidence value calculated for each sentence with a preset threshold value to generate a summary by extracting a sentence having a confidence value equal to or larger than the preset threshold value. In an optional embodiment, the conversation contents summary generating device 100 may generate a summary as a sentence formed by reconstructing determined core keywords, and may generate an audio summary obtained by converting the summary into a sound. Here, the audio summary may include an audio file obtained by text-to-speech (TTS) conversion of a summary, and the conversation contents summary generating device 100 may further have a TTS conversion function.

In operation S850, the conversation contents summary generating device 100 exposes a summary on a second surface different from a first surface on which a chat room is exposed, and overlays and exposes the second surface on the first surface. Here, the first surface may include, for example, a single entire screen on the display unit or a screen (not shown) of the user terminal 200. Although the second surface is displayed together with the first surface, the second surface may include a partial screen smaller than the first surface and disposed on a certain portion of the first surface. Since the first surface and the second surface are displayed together, the user may check a summary exposed on the second surface while viewing a state of a chat room exposed on the first surface.

The example embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of program code include both machine code, such as produced by a compiler, and higher level code that may be executed by the computer using an interpreter.

As used in the present application (especially in the appended claims), the terms "a/an" and "the" include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example," etc.) used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various alterations, substitutions, and modifications may be made within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A method for generating a summary of conversation contents, the method comprising:
    collecting conversation texts input by a plurality of conversation participants in a chat room;
    providing a summary providing interface for outputting a summary of a predetermined range of the conversation texts within the chat room when an operation signal for reviewing a past conversation text is received from the user within a user's chat room including the conversation participants;
    determining keywords from the predetermined range of the conversation texts within the chat room in response to selection reception by the summary providing interface;
    generating the summary as a sentence formed by reconstructing the keywords; and
    exposing the summary on a second surface different from a first surface on which the chat room is exposed, and overlaying and exposing the second surface on the first surface,
    wherein the generating the summary comprises:
    extracting sentences including core keywords from the conversation texts;
    calculating a confidence value from a distribution of the core keywords for each of the extracted sentences; and
    comparing the confidence value calculated for each of the extracted sentences with a preset threshold value to generate a summary by extracting a sentence having a confidence value equal to or larger than the preset threshold value.

2. The method of claim 1, wherein the collecting the conversation texts comprises converting and collecting an abbreviation included in the conversation texts into an original word.

3. The method of claim 1, wherein the collecting the conversation texts comprises converting and collecting an emoticon included in the conversation texts into an emoticon text represented by the emoticon through image analysis of the emoticon.

4. The method of claim 1, wherein the collecting the conversation texts comprises extracting and collecting a text tagged to an emoticon included in the conversation texts.

5. The method of claim 1, wherein the providing the summary providing interface comprises providing the summary providing interface for outputting a summary of the conversation texts falling within a range from a section in which a conversation text is not input by the user to a most recent section within the chat room.

6. The method of claim 1, wherein the providing the summary providing interface comprises providing the summary providing interface for outputting a summary of the conversation texts falling within a range from a conversation text not read immediately before the user enters the chat room to a most recent conversation text.

7. The method of claim 1, wherein the providing the summary providing interface comprises providing the summary providing interface for outputting the summary of the predetermined range of the conversation texts within the chat room when a touch-related operation signal among scrolling operation signals including a touch and drag operation for reviewing the past conversation text is received from the user within the user's chat room including the conversation participants.

8. The method of claim 1, wherein the providing the summary providing interface comprises providing an audio summary providing interface for outputting an audio summary of the predetermined range of the conversation texts within the chat room when the operation signal for reviewing the past conversation text is received from the user within the user's chat room including the conversation participants.

9. The method of claim 8, further comprising generating an audio summary obtained by converting the summary into a sound in response to selection reception by the audio summary providing interface.

10. The method of claim 1, wherein the determining the keywords comprises:
    decomposing the collected conversation texts into morphological units, and extracting at least one noun, at least one interrogative pronoun, and at least one word indicating a tense; and
    determining the at least one noun as the keyword, or extracting a word corresponding to an answer to the interrogative pronoun from the collected conversation texts to determine the extracted word as the keyword, or determining the word indicating the tense as the keyword.

11. A device for generating a summary of conversation contents, the device compn sing:
    a collecting unit configured to collect conversation texts input by a plurality of conversation participants in a chat room;
    a providing unit configured to provide a summary providing interface for outputting a summary of a predetermined range of the conversation texts within the chat room when an operation signal for reviewing a past conversation text is received from the user within a user's chat room including the conversation participants;
    a determining unit configured to determine keywords from the predetermined range of the conversation texts within the chat room in response to selection reception by the summary providing interface;
    a generating unit configured to generate the summary as a sentence formed by reconstructing the keywords; and
    an exposing unit configured to expose the summary on a second surface different from a first surface on which the chat room is exposed, and overlay and expose the second surface on the first surface,
    wherein the generating unit is further configured to:
    extract sentences including core keywords from the conversation texts;
    calculate a confidence value from a distribution of the core keywords for each of the extracted sentences; and
    compare the confidence value calculated for each of the extracted sentences with a preset threshold value to generate a summary by extracting a sentence having a confidence value equal to or larger than the preset threshold value.

12. The device of claim 11, wherein the collecting unit converts and collects an abbreviation included in the conversation texts into an original word.

13. The device of claim 11, wherein the collecting unit converts and collects an emoticon included in the conversation texts into an emoticon text represented by the emoticon through image analysis of the emoticon.

14. The device of claim 11, wherein the collecting unit extracts and collects a text tagged to an emoticon included in the conversation texts.

15. The device of claim 11, wherein the providing unit provides the summary providing interface for outputting a summary of the conversation texts falling within a range from a section in which a conversation text is not input by the user to a most recent section within the chat room.

16. The device of claim 11, wherein the providing unit provides the summary providing interface for outputting a summary of the conversation texts falling within a range from a conversation text not read immediately before the user enters the chat room to a most recent conversation text.

17. The device of claim 11, wherein the providing unit provides the summary providing interface for outputting the summary of the predetermined range of the conversation texts within the chat room when a touch-related operation signal among scrolling operation signals including a touch and drag operation for reviewing the past conversation text is received from the user within the user's chat room including the conversation participants.

18. The device of claim 11, wherein the providing unit provides an audio summary providing interface for outputting an audio summary of the predetermined range of the conversation texts within the chat room when the operation signal for reviewing the past conversation text is received from the user within the user's chat room including the conversation participants.

19. The device of claim 18, wherein the generating unit generates an audio summary obtained by converting the summary into a sound in response to selection reception by the audio summary providing interface.

20. The device of claim 11, wherein the determining unit:
- decomposes the collected conversation texts into morphological units, and extracts at least one noun, at least one interrogative pronoun, and at least one word indicating a tense; and
- determines the at least one noun as the keywords, or extracts a word corresponding to an answer to the interrogative pronoun from the collected conversation texts to determine the extracted word as the keyword, or determines the word indicating the tense as the keyword.

* * * * *